United States Patent [19]

Fennell et al.

[11] 4,424,514
[45] Jan. 3, 1984

[54] DECODER FOR TRANSMITTED MESSAGE ACTIVATION CODE

[75] Inventors: Robert D. Fennell, Coral Springs; David F. Bailey, Plantation; Charles J. Ganucheau, Jr., North Lauderdale, all of Fla.

[73] Assignee: Motorola, Inc., Schaumburg, Ill.

[21] Appl. No.: 310,592

[22] Filed: Oct. 13, 1981

[51] Int. Cl.³ .......................... H04Q 9/00; H04Q 7/00; H04B 7/26; H04M 11/02
[52] U.S. Cl. ........................... 340/825.52; 340/825.44; 179/2 EC
[58] Field of Search ...................... 340/825.52, 825.44; 179/2 EC

[56] References Cited

U.S. PATENT DOCUMENTS 4,178,476 12/1979 Frost .............................. 340/825.44
4,352,955 10/1982 Kai et al. ......................... 179/2 EC

FOREIGN PATENT DOCUMENTS 53-63905 6/1978 Japan .............................. 340/825.44

Primary Examiner—Donald J. Yusko
Attorney, Agent, or Firm—Philip R. Wadsworth; Joseph T. Downey; James W. Gillman

[57] ABSTRACT

A decoder for a receiver which after receiving its address code waits for an activation code before enabling its message output in anticipation of receiving a transmitted message. Alternatively the receiver, after it receives its address, may wait for an activation code before alerting or outputting an internally generated message.

17 Claims, 11 Drawing Figures

FIG. 1

DECODER FOR TRANSMITTED MESSAGE ACTIVATION CODE

BACKGROUND OF THE INVENTION

Prior art message systems generally function upon the detection of coded signals which are predesignated to correspond to an address of an individual receiver. Some prior art digital coding systems operate by having a plurality of receivers asynchronously come on on a timed basis to look for the presence of a digital word to determine if they should remain on for the detection of a possible message. This constitutes a form of battery saving to the receiver population.

A limitation of such prior art systems is that there is not a convenient method of arranging group call at the transmitter site or paging terminal so that an arbitrary plurality of pagers may be activated simultaneously. A further limitation with the prior art occurs for tone and voice systems in which the paging receiver provides an alert time after which a voice message may be detected. Each time an individual paging receiver is paged with a voice message the alert time interval during which the pager user is warned so that he may respond to the subsequent audio message is lost to the system since no other information can be transmitted during that interval. If for example, another tone and voice pager were addressed during the alert time for the first addressed tone and voice pager at the conclusion of the second addressed tone and voice pagers alert time its audio channel would be enabled to catch a substantial portion of the voice message for the first addressed tone and voice pager thereby possibly confusing the paper users with respect to the messages they receive.

One aspect of the present invention includes the positioning of an activation code signal within a broadcast message system such that all receivers which have been correctly addressed remain in a ready state until the detection of an activate code signal which then causes simultaneous activation of the operational routine. Although the specific invention is embodied within a digital paging system it is clear to those skilled in the art that it may have many other uses and formats. Moreover the use of such an activation control signal enables the interleaving of messages within a message alert time especially for a tone and voice pager which has been addressed and ensures that the second addressed tone and voice pager will not activate until it receives an activation code signal subsequent to its address. Thus there is no chance that the second address tone and voice pager could come on during the time period in which the first pager was receiving its variable length voice message. Another advantage of such a system is that it further allows interleaving of various types of messages including tone only, data and tone and voice into one signalling system thereby substantially enhancing the flexibility of the transmitted message system.

SUMMARY OF THE INVENTION

It is an object of the present invention to provide an improved decoder for transmitted coded information.

It is a further object of the invention to provide a decoder responsive to the detection of deactivation control signals to terminate processing of transmitted coded information.

A decoder for a receiver in a plural population of receivers for receiving transmitted coded information signals comprising, means responsive to received coded signals designating the address of an individual receiver in the plural population of receivers, means responsive to the detection and decoding of an address of an individual pager for establishing a time interval and means responsive to the established time window for detecting and decoding activation code signals to enable response of the addressed receiver.

BRIEF DESCRIPTION OF THE DRAWINGS

FIGS. 1 A-G are timing diagrams for the encoded message system for the present invention.

DESCRIPTION OF THE PREFERRED EMBODIMENT

Figure 1:
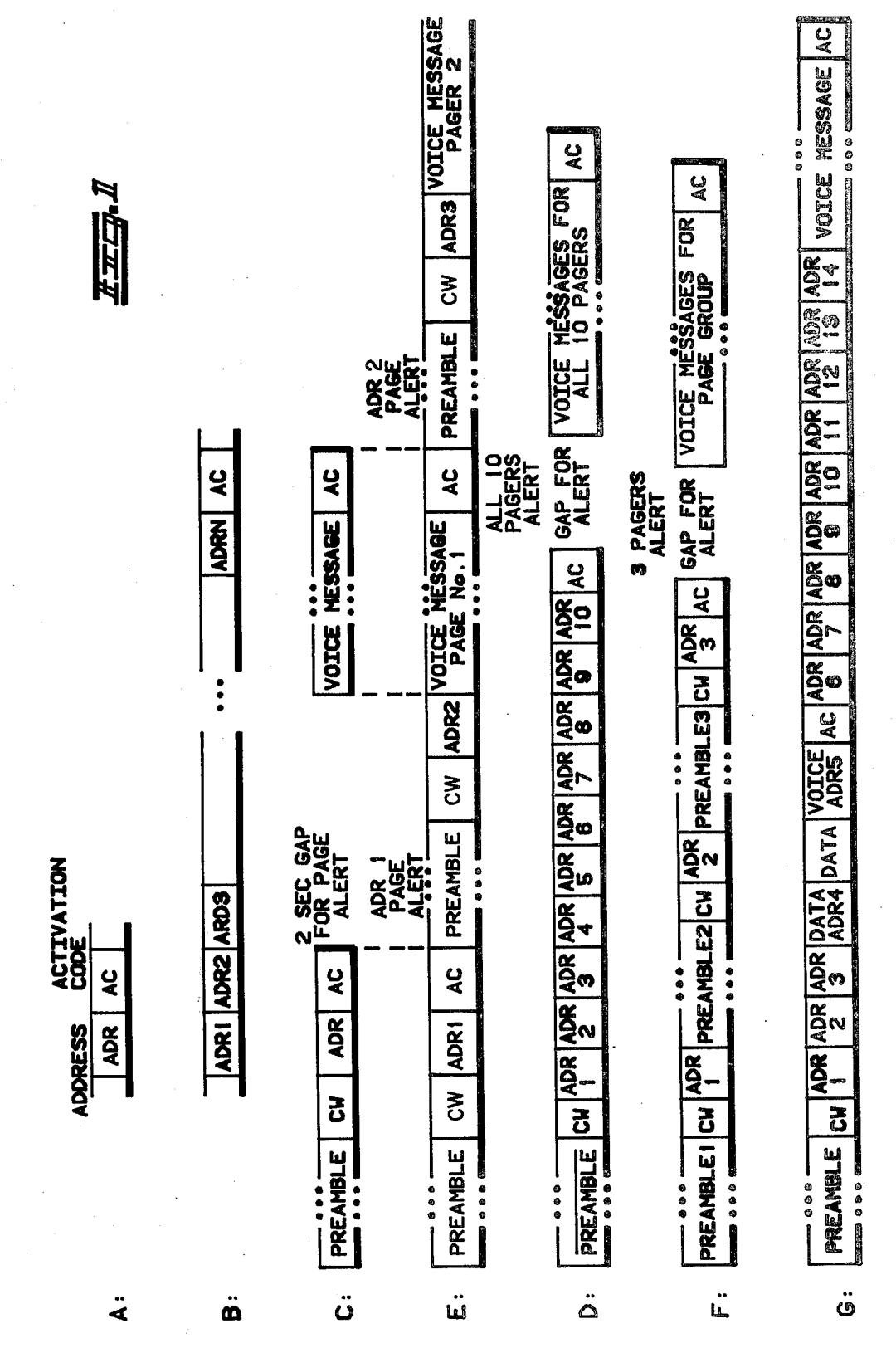
Figure 2:
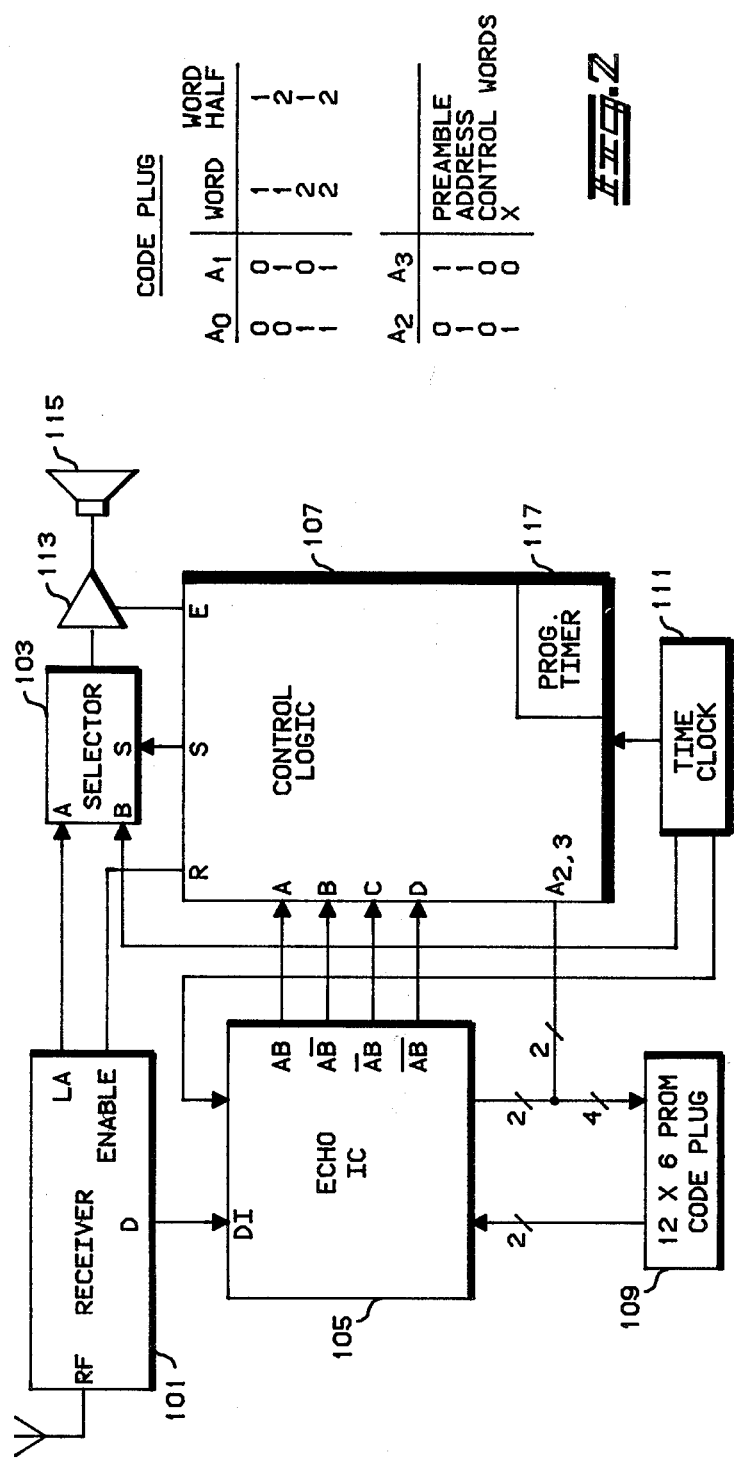
FIG. 2 is a functional block diagram of a hardware embodiment of the present invention.

FIG. 1A a timing diagram illustrating the use of the activation code signal in connection with addressing a receiver. Normally receivers detect their address and immediately respond by whatever function corresponds to the predetermined address which has been detected. While this is common in the prior art, it is distinctly advantageous to provide an additional activation code signal which controls the time at which the receiver will respond to the detection of its address. Thus the inclusion of the activation control signal allows the transmitter to determine precisely when any addressed receiver will become active.

As may be more clearly seen by referring to FIG. 1B a plurality of receivers may be grouped by including a series of addresses in sequential fashion followed by an activation code signal at the conclusion of whatever arbitrary number of addresses may be chosen to form a batch. The advantage is that upon reception of the activation code all members of the arbitrarily designated batch of receivers will all respond simultaneously. Thus it may be seen that the terminal operator at the transmitter site can create an arbitrary grouping of receivers and cause their subsequent simultaneous activation. This can be an distinct advantage not only in message systems but in simultaneously controlling a plurality of operations at some remote site.

While it is clear that many types and formats of signal coding may be utilized for the present invention the preferred embodiment utilizes a digital signal system designated as the Golay Sequential code. The Golay Sequential Code (GSC) is a selective call paging protocol based largely on the current Golay binary paging format. A full description of the Golay code may be found in a paper entitled "Selective Signalling for Portable Applications" by Leonard E. Nelson, 28th IEEE Vehicular Technology Conference, Denver, Colo., Mar. 22-24, 1978. The Golay Sequential Code is an NRZ binary signaling format that has been greatly modified from an earlier format to accommodate intermixed tone only, tone and data, as well as tone and voice paging and now improved battery saving.

The GSC is an asynchronous paging format which allows pages to be transmitted individually or in batches. Maximum message thoughput for tone only and tone and data pages is achieved in the batch transmission mode; while the individual call mode is useful in tone and voice paging.

The single call address format consists of a preamble, a control word, an address code, and for voice paging, an Activation Code (AC). The preamble serves to divide pagers within the system into groups for improved battery life, as well as to uniquely identify GSC transmissions from other coding schemes to faciliate channel sharing without sacrificing battery life or false call integrity. The control word delimits the end of the preamble and it supplies timing information for the batch mode decoding. The address uniquely identifies each pager and the AC is used to control the pager audio circuits in voice paging. The batch mode of operation allows a string of addresses to be transmitted following the control word.

A data message consists of an address followed by one or more data blocks. Data messages may be transmitted individually in the single call mode or intermixed with address only pages in the batch mode of transmission. Address and data blocks are exactly the same length. The address information is constructed from words selected from the Golay (23, 12) cyclic code while the data information is encoded using the (15, 7) BCH code. Address information is transmitted at 300 bits/second while data information is transmitted at 600 bits/second.

In addition to enabling pagers to operate in a battery saver mode, the polarity of the preamble identifies the transmission mode single call or batch. For instance, when the preamble words are transmitted with one predetermined bit polarity, the single call mode is identified; if the preamble bits are inverted, the batch mode is indicated.

The control word activation code and address code all use a two word format consisting of 28 bits of comma followed by two (23, 12) code words. The comma is a 1, 0 bit reversal pattern transmitted at 600 bits/second. The two Golay code words (Word 1 and Word 2) are separated by a ½ bit space. The polarity of the ½ bit space shall be opposite the first bit of the second word and the starting comma bit must be of the same polarity as the first bit of the first word. The control word and activation code are predetermined for the preferred system. Word 2 of the control word and activation code are the inverses of the fixed words.

The address format is identical to the control word and activation code formats regarding the number of bits, the rules for comma and the ½ bit space. The address Word 2 may be chosen from any word of the (23, 12) code set except the all Ø's and all 1's combinations. Thus, there are 4094 potential second words made up of 12 information bits and 11 parity bits. The first words are chosen from a 100 word subset of the Golay code. To generate the binary bit patterns for the (23, 12) Golay code, the decimal representation of the code word is converted to binary. This binary representation is rewritten LSB to the left.

Tone only pages are those pager addresses which don't involve a voice message. Although the single call mode can be used, the batch mode of operation is the preferred method of address transmission for tone only and tone and data pages. The activation code is generally not used in tone only paging, but it may be and an extended batch mode is especially useful in the high traffic periods.

The batch transmission format begins with an inverted preamble followed by the control word and up to 16 pager addresses or data blocks. The arriving page requests should be grouped as a function of preamble and transmitted on a time or traffic basis at the discretion of the terminal manufacturer and his customer.

It may be desirable to transmit more than 16 addresses within a single preamble batch. The extended batch mode is intended for these situations. The extended batch scheme extends the batch mode in multiples of 16 addresses without requiring the retransmission of the preamble. To accomplish this extension, the terminal need only send the control word. In theory, the batch could be extended indefinitely; however, a very slight degradation in pager sensitivity will occur with each extension.

The GSC format allows data pages to be intermixed with tone only or tone and voice pages. A data page consists of a pager address followed by one or more data blocks. A data block is identical in length to an address block and may be freely substituted for addresses in the batch operating mode. The single call mode can also be used by following the pager address with the data message. Data information is transmitted at 600 BPS to minimize the cross falsing probability between addresses and data.

FIG. 1C shows for the preferred embodiment of the present invention the timing diagram for the normal message signalling routine of a normal voice page format. FIG. 1C shows that a preamble code signal is transmitted followed by a control word and the address of the individual pager. While this is normal for the operation of pagers generally, the address is followed by an activation code and it is preferably upon the reception and detection of the activation code that the individually addressed pager will commence its two second alert mode to warn the pager user of the presence of a subsequent voice message. At the conclusion of the variable length voice message the preferred embodiment shows the inclusion of a deactivation control word which for the preferred embodiment it is the second detected occurence of the activation control word and results in muting the audio channel.

FIG. 1D is a signal timing diagram showing some of the advantages which may be achieved by the use of an activation control signal with respect to the terminal control of a batch formatted group call. FIG. 1D shows that for the preferred embodiments a preamble inverted signal is broadcast followed by a control word and a series of up to 10 distinct addresses for various pagers. Preamble inverse is used as an indicator in the preferred embodiment of the presence of more than one address and that the pager maintains the receive operation so that it will look for more than one address. This function will be described in greater detail in the description of the preferred embodiment in both its hardware and firmware equivalent embodiments.

Although each of the pagers has correctly detected its address none of them has caused any alert mode to initiate since the activation code has not been received. At the conclusion of the tenth address, the activation code signal is sent which causes the simultaneous actuation of all ten addressed pagers. For a voice paging message call in a tone and voice system, all ten pagers simultaneously go into their approximate two second alert times to alert all of the ten various users for the present of a voice message which is to follow. At the conclusion of the alert time the broadcast voice message is simultaneously received by all ten address pagers. At the conclusion of the variable length voice message the second occurrence of the activation code is interpreted in the preferred embodiment as the deactivation control signal to cause muting of the audio channel for all ten addressed pagers and to enable the system to immediately broadcast additional addresses and other paging information. Thus it may be seen that the use of an activation control signal allows the terminal control of an arbitary batch of pagers to achieve a simultaneous function. Moreover a message can be sent to a plurality of pagers arbitrarily selected at the terminal site into a batch simultaneously.

FIG. 1E is a message timing diagram showing the advantages of the use of an activation code to utilize normal unusable alert time for an individually addressed and activated pager to increase the information throughput for the message system by additionally addressing without activation of an additonal pager. FIG. 1E in sequence shows that a preamble signal is followed by the customary control word, address 1 and an activation code for a first pager. Upon receipt of the activation code the address 1 pager goes into an approximate two second alert time to warn the pager user that a voice message is to follow. Normally for such tone and voice systems or other similar systems, no utilization can be made of the alert time delay. Thus there is a two second loss of otherwise valuable broadcast time during which additional information could be transmitted. As may be seen in FIG. 1E during the two second alert time the preamble control word and second address for a second pager can be transmitted without affecting either the operation of the first pager or the operation of the second pager. At the conclusion of the second address the transmitter then provides the variable length voice message for the first page which is received by only the addressed and activated pager number 1.

At the conclusion of the variable length voice message for paging number 1 the activation code second detection operates as a deactivation code for the addressed and actuated pager 1. This also corresponds to the activation code for the second addressed but as yet not activated pager, thus the second transmission of the activation code positively terminates the operation of the first addressed and activated pager and establishes the normal sequence for operation for the second addressed and now actuated pager.

In normal operation there is a two second address two page alert time during which time a third preamble control word and third address may be transmitted to correctly address but not activate a third pager. As before at the conclusion of the third address the voice message for the second address pager commences and in a manner similar to the voice message for the first pager it will be concluded by the second occurrence of the activation code which for the address and activated pager 2 will be interpreted as a deactivation control word while simultaneously being interpreted by the addressed but as yet unactivated pager 3 as the correct activation code for it to start its alert sequence. Thus it may be seen from FIG. 1E that the overall message information system can be tightly packed with complete utilization of the normal two second alert time which ordinarily would be lost to a transmitter system operator and thus materially enhance the information throughput for the system.

FIG. 1E shows the message timing diagram for an additional variant form of the use of the activation code for what may be referred to as a formatted terminal group call. While FIG. 1D shows the operation of addressing a string of ten or more pagers, because of the construction of the code signal population for the preferred embodiment it was necessary to use the preable bar designation to cause this system to go into a mode in which more than one address could be decoded. Of necessity this indicates that those addressed pagers must all be in the same proportion of the population so that they can respond to the same preamble. To demonstrate the greatly increased flexibility of an information system employing an activation control word, FIG. 1F shows that the individual pagers which may be grouped do not have to be related by having a common preamble.

FIG. 1F shows that th the transmitter can provide preamble 1 followed by control word and address one which are followed by preamble two, a control word and address two, which is followed by preamble three, control word and a third address. The sequence is purely arbitrary and the length depends on how long the time period has been designated for the system to stay up and look for an activation code. The transmitter then provides an activation code signal which causes the simultaneous activation of all three addressed but not activated pagers from three completely arbitrary groupings of the possible receiver population. At the conclusion of the transmission of the activation code all three address paging receivers simultaneously go into the alert mode and at the conclusion of the alert mode all three pagers simultaneously respond to the then transmitted voice message which is terminated with the second occurrence of the activation code which for the three addressed and actuated pagers constitutes a deactivation control signal.

There are many other variant forms for combinations of the use of an activation control signal and such a message information system. FIG. 1G shows a message timing diagram for a substantially mixed system operation in which a preamble bar signal followed by a control word, three normal addresses, a data address, data information, a voice address for a fifth receiver, all cause three tone only pagers, one data pager and one voice pager to be correctly addressed but not activated. Normally for the preferred embodiment, the activation code is utilized for tone only operation but may be easily modified. The voice address for the fifth pager is then followed by the activation code which causes the voice pager to go into its alert mode so that the pager user can be prepared to receive the voice message. Upon the reception of the activation code it will be appreciated that the first three tone only page carriers have received the signal that a page has been received and that the data page information and subsequent data information which can also be encoded in such systems are already received.

During the alert time for the voice addressed pager nine additional tone only addresses can be broadcast followed by a short time gap for the system of the preferred embodiment which is less than one equivalent word length. This is then followed by the variable length voice message. The variable length voice message is then supplied only to the fifth addressed voice pager which has been activated by the first reception of the activation code. At the conclusion of the variable length voice message the second activation code terminates the operation of the voice channel for the fifth activated voice pager and also causes activation of the nine additional address tone only pagers so that no time is lost in the system.

It will be appreciated by those familiar with such data information systems that normally tone only operation causes an alert signal to be provided to the pager user for a fixed timeout period thus it is not necessary in the case of tone only pages to send a deactivation code to terminate the message since the receiver itself provides an alert for a short fixed length of time. Moreover it may be seen that addressing a data pager and following it subsequently with the data information and then in sequence an activation code will cause first the addressing and detection of the data message and subsequently the activation of the pager to announce the detected message. Those skilled in the art will appreciate that there are many other variant forms of the use of an activation code to material enhance the throughput of information in such information transmission systems, especially for the interleaving of messages of mixed type and for the simultaneous activation of previously addressed receiver units. This simultaneous activation can cause functions to occur simultaneously at various remote locations as in combination with the activation code used for selectively and sequentially addressed pagers can cause time sequenced operations to occur at remote locations.

FIG. 2 shows a schematic diagram of a decoder circuit for a pager which receives and decodes an activation word in accordance with the invention. A receiver 101 (preferably a Motorola BPR 2000) receives a transmitted signal from a remote transmitter and processes that signal into a linear audio output and a limited audio output designated in FIG. 2 as output LA and output D, respectively. The limited audio signal D outputted by receiver 101 is a digital signal inputted to an echo chip 105. Echo chip 105 is an asynchronous externally clocked sequential digital word detector as described in U.S. Pat. No. 3,855,576 assigned to Motorola, Inc. A control logic 107 is preferrably a PLA used as a sequential logic control for the decoder system.

When the receiver 101 receives a limited audio signal (digital signal) the signal is inputted to the echo chip 105 and correlated with a stored address within the echo chip. The stored address is inputted to the echo chip 105 from a code plug 109. Code plug 109 is an expanded version of code plug 36 in U.S. Pat. No. 3,855,576 mentioned above. In particular, the code plug is a 12×6 PROM. A timing clock 111 provides a time base for control logic 107 and echo chip 105. A selector circuit 103 selectively outputs either the linear audio signal from receiver 101 output LA or a 1.7 kilohertz signal from time clock 111. The 1.7 kilohertz from time clock 111 provides an audible tone when passed through selector 103 to amplifier 113 and speaker 115. The selector 103 is controlled by output lines from control logic 107. Amplifier 113 is enabled in response to output signal E from control logic 107. A programmable timer 117 is loaded by control logic 107 with appropriate time durations which serve to provide the maximum time duration allowed for certain sequential events to be described in connection with FIG. 3.

Echo chip 105 outputs a detection signal at output $\overline{AB}$ or output AB when the echo chip 105 correlates a received limited audio signal with a stored address code for the pager. The output of the echo chip 105 will recognize both the transmitted address and the transmitted inverted address. As will become clear in connection with FIG. 3, the inverted address informs the decoder circuitry and in particular the control logic 107 that a group call operation is being performed. The table accompanying FIG. 2 shows the four lines of address $A_0$, $A_1$, $A_2$ $A_3$ inputed to code plug 109. Two of the address lines ($A_0$, $A_1$) are from echo chip 105. The first table accompanying FIG. 2 shows the possible combination of states for $A_0$ and $A_1$.

Each transmitted message, whether it be a preamble, a pager address, or a control word, is transmitted as a cell which is subdivided into two words which are in turn divided into word halves. Therefore to read a total cell into the echo chip 105 for correlation with serially received limited audio date from receiver 101, it is necessary for the echo chip 105 to control through outputs $A_0$ and $A_1$ the reading of a total cell from code plug 109. As can be seen from the first table accompanying FIG. 2 the echo chip 105 reads the code plug 109 one half word at a time. The communication between echo chip 105 and code plug 109 is more fully described in U.S. Pat. No. 3,855,576. The outputs $A_2$, $A_3$ from control logic 107 controls what code cell that echo chip 105 reads.

Figure 3:
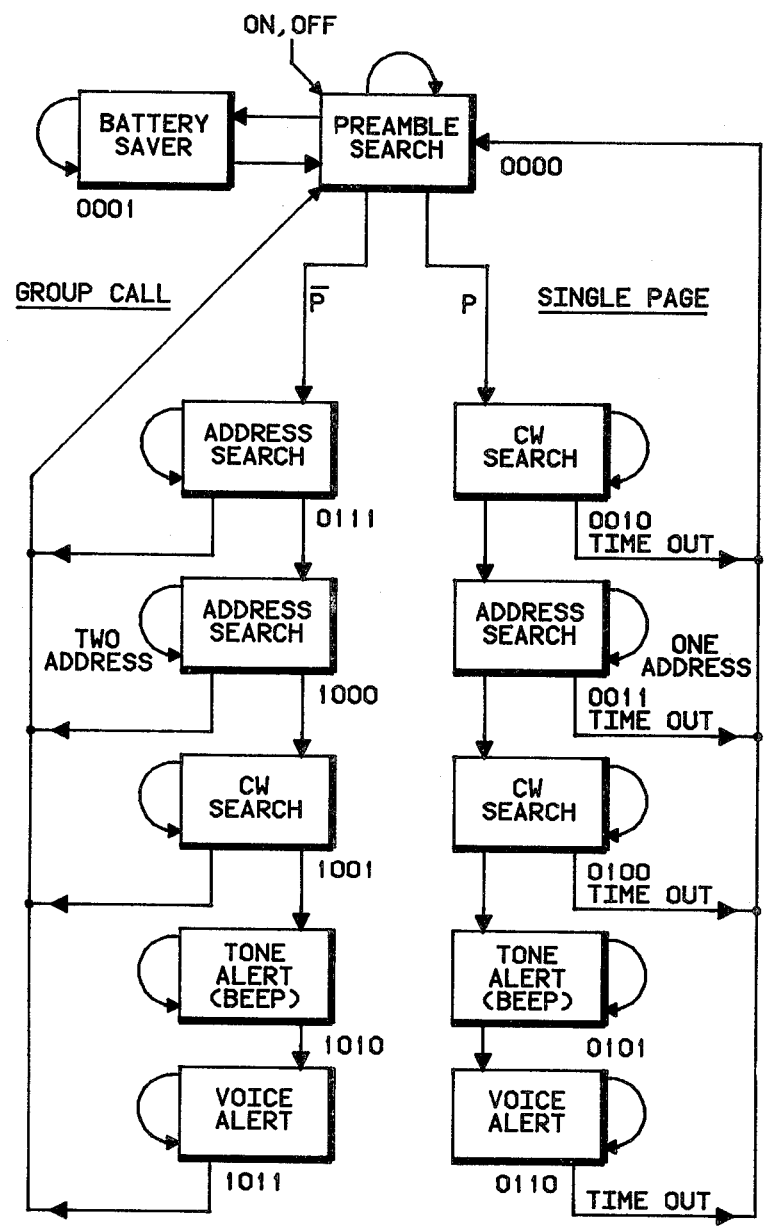
FIG. 3 is a state diagram representing the functions for the diagram of FIG. 2.

FIG. 3 shows a state diagram of a pager having the decoder circuit shown in FIG. 2. From a turn off state (state 0) the decoder is turned on and initializes itself into state 1. In state 1 the control logic 107 is addressing the code plug 109 with the binary code for a preamble. The echo chip 105 reads from code plug 109 the total binary cell for the pager's preamble. The echo chip 105 correlates the limited audio signal received from receiver 101. The chip outputs on lines AB and not $\overline{AB}$ the status of the correlation.

The control logic 107 outputs a signal from its output R to the enable input of receiver 101 to control the receiver 101 as it searches for the pagers preamble. The control logic 107 times the enabling of the receiver 101 through an internal timing scheme referenced from time clock 111. The turning off of receiver 101 by the control logic 107 output R is shown as state 2 in FIG. 3. The decoder circuitry oscillates between states 1 and 2 until the limited audio signal inputted to echo chip 105 correlates with the stored code cell in echo chip 105. This mode of operation is commonly known as battery saver operation.

The control logic 107 holds amplifier 113 in a disabled condition while the decoder is in both states 1 and 2. In the transition from state 1 to state 2 the control logic 107 loads a battery saver duration time into programmable counter 117. The counter 117 counts out this time and returns the decoder to state 1. If a preamble is detected while the receiver 101 is enabled, a transition will occur to either state 3 or state 8. In either transition the control logic 107 will load programmable timer 117 with a control word search duration.

Echo chip 105 can detect both the binary code for the pagers preamble and the inverted binary code for the pagers preamble. If echo chip 105 correlates a non-inverted preamble, then control logic 107 receives a detection signal on its input line A. If echo chip 105 correlates an inverted preamble than control logic 107 receives an input on its D input. From these two different types of preambles the control logic 107 can determine whether the transmitted message is a group call or a single page. The inverted preamble indicates a group call whereas the non-inverted preamble indicates a single call. If echo chip 105 receives a non-inverted preamble the transition is from state 1 to state 3. If echo chip 105 receives an inverted preamble the transition is from state 1 to state 8. Discussion of the group call will be held in abeyance while the transition from state 1 to state 3 is described.

In state 3 the control logic holds the receiver 101 on at all times. The control logic 107 outputs $A_2$ and $A_3$ which instruct the code plug 109 to output the binary code for the control word. The control logic 107 holds the amplifier 113 in an off condition. The echo chip 105 interrogates the code plug 109 for the full binary cell of the control word and correlates the control word with the limited audio signal it receives from the receiver 101. Control logic 107 is waiting for a detection signal on input A from echo chip 105. Since the amplifier 113 is deactivated the state of selector 103 can be arbitrary. If the echo chip 105 never correlates the control word the programmable timer 117 will time out and the control logic 107 and the remainder of the decoder will return to state 1. In returning to state 1, the programmable counter 117 will again be loaded with the preamble search duration. This must be done each time the decoder returns to state 1. In each of the following states returning to state 1 is a possible option, as can be seen from FIG. 3. The transition from a state back to state 1 will not be dealt with in detail for every state since they are all identical or very similar.

When the echo chip 105 positively correlates a control word a detection signal is outputted from line AB of the echo chip 105 to the A input of control logic 107. This causes the decoder to transfer from state 3 to state 4. During this transfer, the programmable counter 117 is loaded with the time duration for the decoder to search for the pager's address cell. The control logic 107 outputs $A_2$ and $A_3$ which instruct the code plug 109 to output the binary cell for the pager address. The echo chip 105 communicates with the code plug 109 in the manner described before (and also more completely described in U.S. Pat. No. 3,855,576). The transition from state 4 can be in two paths. If the echo chip 105 does not correlate the pager address the programmable timer 117 will time out and the decoder will return to state 1. If the echo chip 105 correlates the pager address, a detection signal will be sent out from the echo chip output AB into the A input of control logic 107. The control logic 107 will load the programmable timer 117 with the maximum time duration for the decoder to search for a control word.

After the echo chip 105 has correlated the pager address, the decoder transfers from state 4 to state 5. The control logic output $A_2$ and $A_3$ instructs the code plug 109 to output the cell for the code word. The echo chip 105, while in state 5, looks for a correlation between the stored code word and the limited audio input. The control logic 107 waits for a correlation signal at its A input. From state 5 there are again two possible transitions. If the echo chip does not receive a control word, the control timer 117 will time out and the decoder will return to state 1. If the echo chip 105 detects a control word, the decoder will transfer to state 6. During the transfer the programmable counter 117 will be loaded by control logic 107 with a time duration for the beep alert.

In state 6 the control logic 107 enables the B input of selector 103 thus allowing the 1.7 kilohertz signal to pass through the selector 103 and into amplifier 113. The control logic 107 enables the amplifier 113 causing the speaker 115 to sound an audible tone. During the state 6 beep period, the control logic 107 inhibits the A and D inputs. Consequently, the state of echo chip 105 and code plug 109 are arbitrary. The beep time ends by programmable timer 117 timing out. There is only one possible transition from state 6, i.e., the timing out of the programmable timer 117. The transition from state 6 is to state 7. During the transition the programmable timer 117 is again loaded with a time duration. This time the duration corresponds to the maximum voice duration.

In state 7 the control logic 107 activates the A input of selector 103 in anticipation of receiving a voice from the linear audio output of receiver 101. The amplifier 113 is enabled as it was in state 6. The A input to control logic 107 is inhibited as it was in state 6. And correspondingly echo chip 105 and code plug 109 are in arbitrary states. The transition from state 7 is to state 1. The transition occurs when the programmable timer 117 times out the voice duration.

Returning to the transition from state 1 to state 8, the group call operation of the pager begins with the decoder in state 1 searching for the preamble as discussed previously. For the decoder to transfer to state 8 the echo chip 105 must correlate an inverted preamble received at its limited audio input. Upon correlation and detection of the inverted preamble, the transition from state 1 to state 8 is identical to the transition from state 1 to state 3. State 8 is identical to state 3. The transition from state 8 to state 9 is the same as transition from state 3 to state 4.

In state 9 the search time loaded into programmable counter 117 is for a longer duration. The reason for the longer duration is that the decoder must look for its own address within a group of addresses being transmitted. Since these addresses are transmitted serially a particular pager's address could be transmitted last of a group thereby requiring a longer search duration than in the single page operation (state 4).

The transition from state 9 to state 10 is the same as the transition from state 4 to state 5. State 10 is the same as state 5. The transition from state 10 to state 11 is the same as the transition from state 5 to state 6. State 11 is the same as state 6 and the transition from state 11 to state 12 is the same as the transition from state 6 to state 7. State 12 is identical to state 7 and the transition from state 12 to state 1 is the same as state 7 to state 1.

Table I on the following page is a time sequential logic table of the PLA comprising control logic 107 in accordance with the invention.

TABLE 1

| LOGIC TABLE for PLA | | | | | | | | | | | | | | | |
|---|---|---|---|---|---|---|---|---|---|---|---|---|---|---|---|
| INPUTS | | | | | | | | | | OUTPUTS | | | | | |
| Counter | | | Present State | | | | Next State | | | | | | | Programmable Timer | |
| A | D | O | $Q_3$ | $Q_2$ | $Q_1$ | $Q_o$ | $D_3$ | $D_2$ | $D_1$ | $D_o$ | R | S | E | $A_3$ $A_2$ | Count |
| 0 | 0 | 0 | 0 | 0 | 0 | 0 | 0 | 0 | 0 | 0 | 1 | X | 0 | 0  1 | X |
| 0 | 0 | 1 | 0 | 0 | 0 | 0 | 0 | 0 | 0 | 1 | X | X | 0 | X  X | Battery Save Duration (1.2 Sec.) |
| 1 | 0 | X | 0 | 0 | 0 | 0 | 0 | 0 | 1 | 0 | 1 | X | 0 | X  X | Control Word Search Duration (20 Sec.) |
| 0 | 1 | X | 0 | 0 | 0 | 0 | 0 | 1 | 1 | 1 | 1 | X | 0 | X  X | Control Word Search Duration (20 Sec.) |

TABLE 1-continued

LOGIC TABLE for PLA

| INPUTS | | | | | | | | | | | OUTPUTS | | | | | |
| --- | --- | --- | --- | --- | --- | --- | --- | --- | --- | --- | --- | --- | --- | --- | --- | --- |
| | | Counter | Present State | | | | Next State | | | | | | | | | Programmable Timer |
| A | D | O | $Q_3$ | $Q_2$ | $Q_1$ | $Q_0$ | $D_3$ | $D_2$ | $D_1$ | $D_0$ | R | S | E | $A_3$ | $A_2$ | Count |
| X | X | 0 | 0 | 0 | 0 | 1 | 0 | 0 | 0 | 1 | 0 | X | 0 | X | X | X |
| X | X | 1 | 0 | 0 | 0 | 1 | 0 | 0 | 0 | 0 | X | X | 0 | 0 | 0 | Preamble Search Duration (.5 Sec.) |
| 0 | X | 0 | 0 | 0 | 1 | 0 | 0 | 0 | 1 | 0 | 1 | X | 0 | 0 | 0 | X |
| 0 | X | 1 | 0 | 0 | 1 | 0 | 0 | 0 | 0 | 0 | 1 | X | 0 | X | X | Preamble Search Duration (.5 Sec.) |
| 1 | X | X | 0 | 0 | 1 | 0 | 0 | 0 | 1 | 1 | 1 | X | 0 | 1 | 1 | One Address Search Duration (.25 Sec.) |
| 0 | X | 0 | 0 | 0 | 1 | 1 | 0 | 0 | 1 | 1 | 1 | X | 0 | 1 | 0 | X |
| 0 | X | 1 | 0 | 0 | 1 | 1 | 0 | 0 | 0 | 0 | X | X | 0 | X | X | Preamble Search Duration (.5 Sec.) |
| 1 | X | X | 0 | 0 | 1 | 1 | 0 | 1 | 0 | 0 | 1 | X | 0 | X | X | Control Word Search Duration (20 Sec.) |
| 0 | X | 0 | 0 | 1 | 0 | 0 | 0 | 1 | 0 | 0 | 1 | X | 0 | 0 | 0 | X |
| 0 | X | 1 | 0 | 1 | 0 | 0 | 0 | 0 | 0 | 0 | 1 | X | 0 | X | X | Preamble Search Duration (.5 Sec.) |
| 1 | X | X | 0 | 1 | 0 | 0 | 0 | 1 | 0 | 1 | X | X | 0 | X | X | Beep Time (2 Sec.) |
| X | X | 0 | 0 | 1 | 0 | 1 | 0 | 1 | 0 | 1 | 0 | 0 | 1 | X | X | X |
| X | X | 1 | 0 | 1 | 0 | 1 | 0 | 1 | 1 | 0 | 1 | X | 1 | X | X | Voice Duration (8 Sec.) |
| X | X | 0 | 0 | 1 | 1 | 0 | 0 | 1 | 1 | 0 | 1 | 1 | 1 | X | X | X |
| X | X | 1 | 0 | 1 | 1 | 0 | 0 | 0 | 0 | 0 | X | X | 0 | X | X | Preamble Search Duration (.5 Sec.) |
| 0 | X | 0 | 0 | 1 | 1 | 1 | 0 | 1 | 1 | 1 | 1 | X | 0 | 0 | 0 | X |
| 0 | X | 1 | 0 | 1 | 1 | 1 | 0 | 0 | 0 | 0 | 1 | X | 0 | X | X | Preamble Search Duration (.5 Sec.) |
| 1 | X | X | 0 | 1 | 1 | 1 | 1 | 0 | 0 | 0 | 1 | X | 0 | X | X | Two Address Search Duration (.5 Sec.) |
| 0 | X | 0 | 1 | 0 | 0 | 0 | 1 | 0 | 0 | 0 | 1 | X | 0 | 1 | 1 | X |
| 0 | X | 1 | 1 | 0 | 0 | 0 | 0 | 0 | 0 | 0 | 1 | X | 0 | X | X | Preamble Search Duration (.5 Sec.) |
| 1 | X | X | 1 | 0 | 0 | 0 | 1 | 0 | 0 | 1 | 1 | X | 0 | X | X | Control Word Search Duration (20 Sec.) |
| 0 | X | 0 | 1 | 0 | 0 | 1 | 1 | 0 | 0 | 1 | 1 | X | 0 | 0 | 0 | X |
| 0 | X | 1 | 1 | 0 | 0 | 1 | 0 | 0 | 0 | 0 | 1 | X | 0 | X | X | Preamble Search Duration (.5 Sec.) |
| 1 | X | X | 1 | 0 | 0 | 1 | 1 | 0 | 1 | 0 | X | X | 0 | X | X | Beep Time (2 Sec.) |
| X | X | 0 | 1 | 0 | 1 | 0 | 1 | 0 | 1 | 0 | 0 | 0 | 1 | X | X | X |
| X | X | 1 | 1 | 0 | 1 | 0 | 1 | 0 | 1 | 1 | 1 | X | 1 | X | X | Voice Duration (8 Sec.) |
| X | X | 0 | 1 | 0 | 1 | 1 | 1 | 0 | 1 | 1 | 1 | 1 | 1 | X | X | X |
| X | X | 1 | 1 | 0 | 1 | 1 | 0 | 0 | 0 | 0 | 1 | X | 0 | X | X | Preamble Search Duration (.5 Sec.) |

Figure 4:
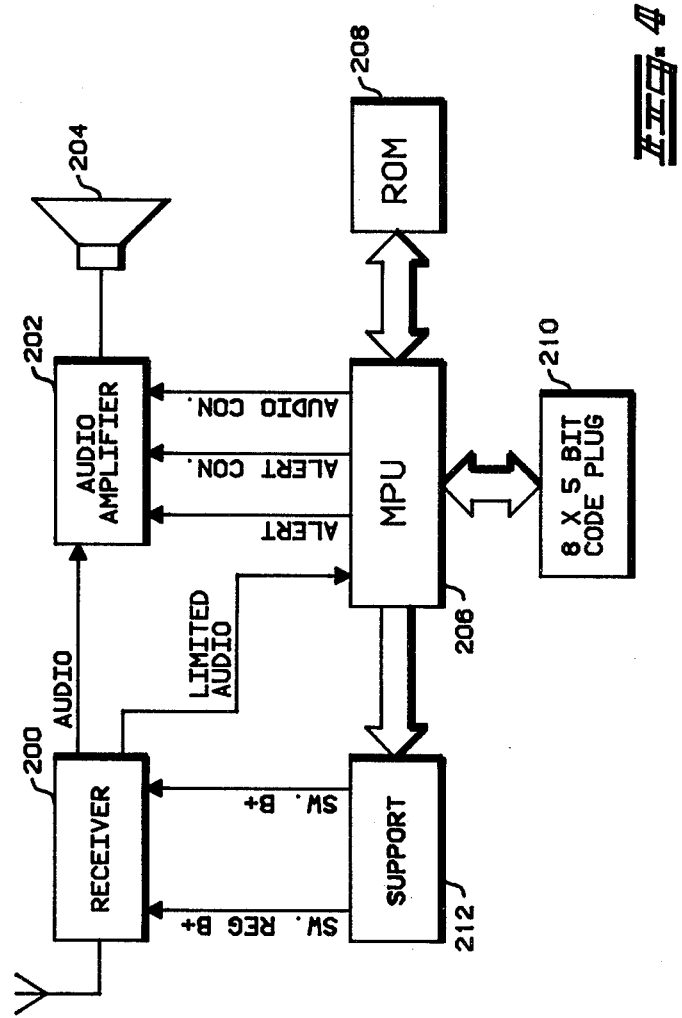
FIG. 4 is an functional block diagram of the firmware embodiment of the present invention.

FIG. 4 shows the receiver and the firmwear embodiment of the present invention. A receiver 200 receives a broadcast signal through an antenna and provides a demodulated audio signal to an audio amplifier 202. Audio amplifier 202 is coupled to an audio speaker 204. An additional output from receiver 200 is provided to a microprocessor 206 in the preferred embodiment is a 146805 microprocessor manufactured by Motorola, Inc. This additional connection from receiver 200 to microprocessor 206 is a limited audio signal which is used for correlation and decoding. Various ports on the microprocessor provide controls to audio amplifier 202 and these are labeled alert, alert control and audio control. A read-only memory 208 provides storage space for the firmwear operation of the microprocessor 206. A read-only memory 210 designated as a code plug provides address information for the individual receiver. Microprocessor 206 is coupled to and supplies signals to support circuitry 212 which, in turn, controls the switching of the regulated B+ and B+ signals to receiver 200.

Figure 5:
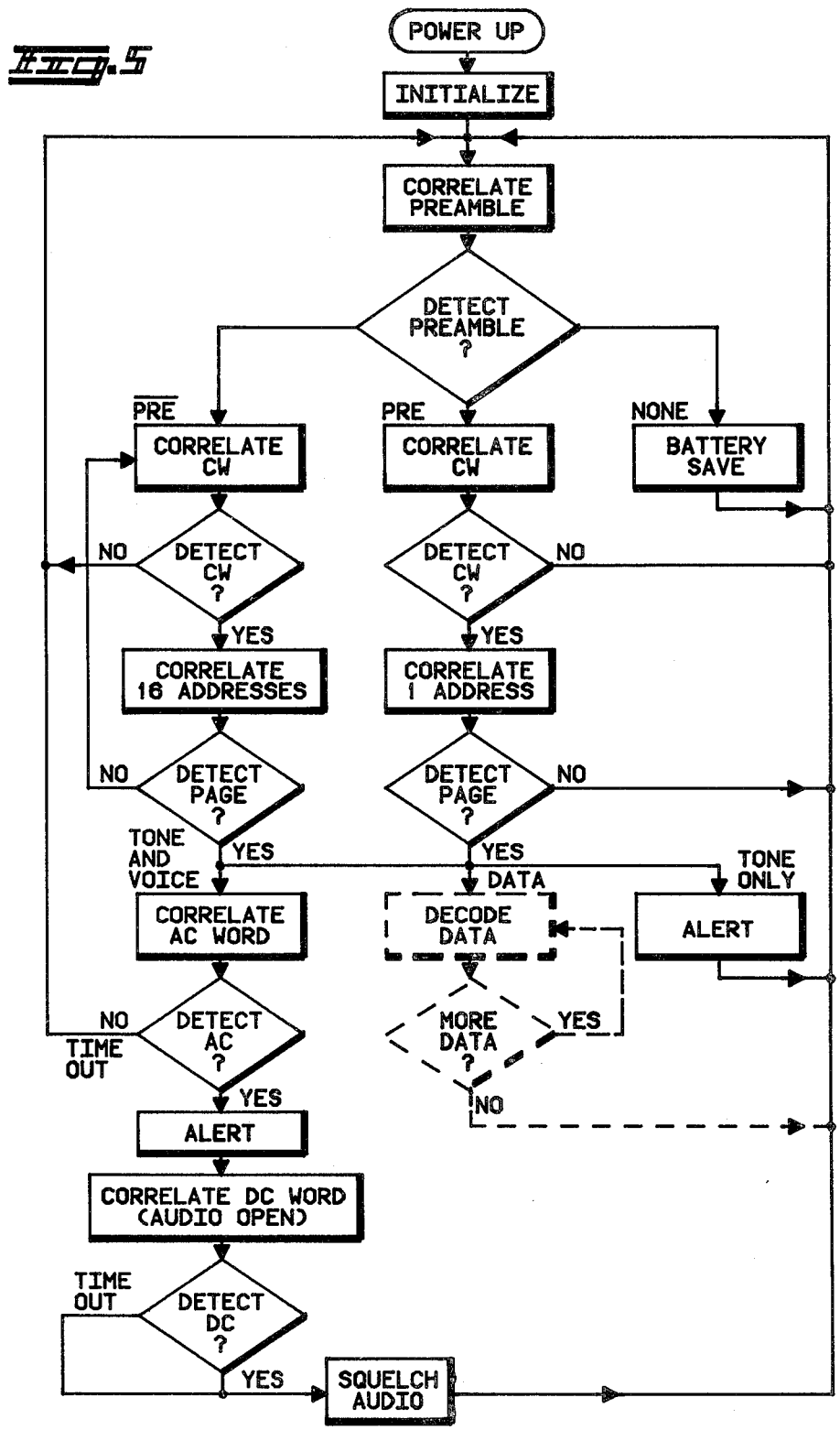
FIG. 5 is a flowchart for the firmware embodiment of the present invention.

FIG. 5 represents the flowchart for the firmwear operation of the microprocessor shown in FIG. 4. The operation of the decoder for the present invention commences with the detection of power up which occurs when the receiver is initially turned on.

During the power up and initialized operations, the microprocessor is made ready for its decoding operation. Part of that readying process includes activating the tone alert until it is reset for times out and in the case of tone and voice operation the audio channel is additionally activated until it is reset.

After initialization, the microprocessor is ready to receive information from the receiver and to decode the signals that are received. For the preferred embodiment these signals are digitally encoded words in a predetermined format of the Golay Sequential Code as described earlier. The correlate preamble detects the presence of a designated preamble word and is used to facilitate battery saving. If no preamble is detected, the pager goes to a battery save mode where the receiver unit is disabled for a specific time period. After that time, the receiver merely comes back on to again asynchronously correlate signals to determine if preamble is present. If preamble or preamble bar signals are detected, the next step is to decode for the presence of the control word signal.

The detection of a preamble signal will specify that the pager should look for one address whereas the preamble bar signal indicates that the pager will remain on for 16 addresses which constitutes a batch mode operation for the preferred embodiment. In either case, if the control word is not detected, the pager returns to the operation correlating for the presence of preamble.

With the occurrence of the preamble signal the receiver correlates the one address and determines whether or not a page has been detected. In this context, the detection of page means that the address from the correlator corresponds to an address which is in the address code plug. If the address is not in the code plug, the operation returns to correlating for preamble.

For the detection of preamble bar, if none of the 16 addresses in the batch correspond to an address which is in the address code memory for the receiver the operation is then returned to correlating for the control word. In this case, since it is already in a batch mode, the presence of a second control word may be used to indicate the continuation of the length of a batch. If the control word is not detected, then operation of the program is returned to correlating for preamble.

If a page is detected by the presence of a corresponding address in one of the possible 16 addresses in the batch, then the decision process depends on whether or not the message transmitted is a tone and voice message or a data message or a tone only message.

If it is a tone only message and the address has been detected, the alert operation may be actuated and after the alert has timed out or been reset, operation of the paging receiver is returned to correlating for preamble. The most comphrensive utilization of the activation and deactivation code signals occurs for the tone and voice description for the present decoder.

Although not part of the preferred decoder, in the event that data is detected as shown in phantom in the diagram, then a decode data operation would be initiated with an interrogation as to whether or not the data stream had concluded. In the event that there existed no more data, the decode data operation would be transferred back so that the device could then correlate for preamble.

For the tone and voice operation, if a page is detected that corresponds to a correct address decoding, the next step is to correlate the activation code word and the decision is then made whether or not the activation code word has indeed been detected. If the activation code is not detected during a predetermined time out period, then control is returned to correlate for preamble. The time out period in the preferred embodiment can be arbitrarily established depending upon what maximum number of concatenated addresses one wishes to have for the message system. If the activate code is detected, then the pager operation goes into the appropriate alert routine which times out after two seconds at which time the voice channel is actuated so that the voice message can be heard.

With the receiver in this mode with the audio channel open, the decoder operates to correlate for the deactivation code word to determine when the open audio should be positively closed. If no deactivation code is detected, there is a fixed time out period after which time the open channel is closed. After the squelching of audio, the decoder operation is returned to correlate for preamble.

Prior art automatically squelching receivers employed the detection of the presence or absence of the carrier signal to determine when the audio channel should be shut down. The advantage of the deactivation control signal word is that it affects only those pagers which have been correctly addressed and have received a message. The voice channel can then be appropriately shut down so as to prevent not only the annoying noise sound but to enable the time period not utilized by the voice message to be utilized by additional addressing operations for the system. Individual messages may be of any length with the system resuming normal operations by adding additional addresses at the end of previous audio messages ended by the deactivation code.

Table 2 shows the hexadecimal core dump of the entire firmware coding program consistent with the language appropriate for the microprocessor shown in FIG. 4. Loading of this code into and appropriate ROM will provide the operation described by the flowchart in FIG. 5.

TABLE 2

| | | | | | | | | | | | | | | | | |
|---|---|---|---|---|---|---|---|---|---|---|---|---|---|---|---|---|
| 4800 | 9B | 3F | 00 | 3F | 04 | 3F | 01 | A6 | 6F | B7 | 05 | 02 | 00 | 5E | A6 | 0C |
| 4810 | B7 | 04 | A6 | 55 | AE | 10 | F7 | 5C | A3 | 80 | 26 | FA | 5A | F1 | 26 | FE |
| 4820 | A3 | 10 | 26 | F8 | 43 | 2B | EF | 27 | 03 | 4F | 20 | EA | 16 | 00 | AE | 7F |
| 4830 | 9C | 15 | 00 | A6 | 08 | 03 | 00 | FD | 01 | 00 | 11 | 08 | 00 | 00 | 76 | 14 |
| 4840 | 00 | 02 | 00 | FD | 15 | 00 | 4A | 26 | EC | 5A | 20 | E7 | 14 | 00 | 02 | 00 |
| 4850 | FD | 15 | 00 | 5C | FC | AE | 08 | 03 | 00 | FD | 17 | 00 | 46 | 24 | 02 | 16 |
| 4860 | 00 | 14 | 00 | 02 | 00 | FD | 15 | 00 | 5A | 26 | EC | 81 | 3F | 11 | 08 | 00 |
| 4870 | 09 | 10 | 11 | 3F | 23 | 0D | 00 | 02 | 1E | 23 | 1D | 00 | 1C | 04 | CD | 1E |
| 4880 | BC | A6 | 0B | B7 | 01 | 1D | 01 | A6 | 04 | B7 | 01 | 1D | 01 | 1D |
| 4890 | 01 | 3F | 01 | A6 | 0E | B7 | 01 | 1D | 01 | 1D | 01 | B6 | 00 | B7 | 10 | 1D |
| 48A0 | 10 | 04 | 10 | 05 | 02 | 10 | 02 | 1C | 10 | 1A | 10 | 5F | A6 | 01 | AD | 29 |
| 48B0 | A6 | 02 | AD | 25 | A6 | 05 | AD | 21 | A6 | 06 | AD | 1D | A6 | 09 | AD | 19 |
| 48C0 | A6 | 0A | AD | 15 | A6 | 0D | B7 | 01 | 1D | 01 | 1D | 01 | B6 | 00 | 46 | 36 |
| 48D0 | 51 | 34 | 51 | A4 | 0F | B7 | 53 | 20 | 1D | B7 | 01 | 1D | 01 | A6 | 02 | B7 |
| 48E0 | 13 | B6 | 00 | 46 | 36 | 51 | 46 | 25 | 02 | 1B | 10 | 66 | 55 | 46 | 66 | 55 |
| 48F0 | 5C | 3A | 13 | 26 | F1 | 81 | 1D | 11 | B6 | 51 | 44 | 24 | 02 | 1C | 11 | 97 |
| 4900 | D6 | 1F | 73 | B7 | 2E | 54 | D6 | 1F | A5 | 25 | 04 | 44 | 44 | 44 | 44 | A4 |
| 4910 | 0F | B7 | 32 | 0D | 11 | 04 | 33 | 2E | 33 | 32 | BE | 53 | D6 | 1F | BE | B7 |
| 4920 | 2D | D6 | 1F | C8 | B7 | 31 | 5F | 36 | 32 | 36 | 2E | 66 | 55 | 36 | 31 | 36 |
| 4930 | 2D | 66 | 55 | 5C | A3 | 0C | 25 | EF | 5F | E6 | 5F | B7 | 56 | E8 | 57 | E8 |
| 4940 | 58 | E8 | 59 | E8 | 5C | E8 | 5F | E7 | 61 | 5C | A3 | 0B | 25 | EB | 5F | E6 |
| 4950 | 55 | 5C | BF | 14 | 5F | 49 | 66 | 2D | 66 | 31 | 66 | 35 | 5C | A3 | 04 | 25 |
| 4960 | F4 | BE | 14 | A3 | 17 | 25 | E8 | 09 | 01 | 0D | AE | 03 | 63 | 2D | 63 | 31 |
| 4970 | 63 | 35 | 5A | A3 | 01 | 26 | F5 | 00 | 11 | 03 | CC | 1A | EE | A6 | 0F | B7 |
| 4980 | 01 | 3F | 1F | 04 | 10 | 03 | 02 | 10 | 06 | 1F | 10 | A6 | 04 | 20 | 08 | 1E |
| 4990 | 10 | 3C | 1F | 14 | 11 | A6 | 30 | B7 | 20 | CC | 1D | 55 | 1F | 22 | A6 | 19 |
| 49A0 | B7 | 1D | BE | 1E | D6 | 1F | DE | B7 | 13 | D6 | 1F | E5 | B7 | 14 | D6 | 1F |
| 49B0 | EC | B7 | 12 | A3 | 00 | 27 | 1D | 5A | A3 | 02 | 25 | 1D | 5A | 5A | 9D | 21 |
| 49C0 | 02 | 1E | 22 | D6 | 1F | D2 | B7 | 17 | D6 | 1F | D6 | B7 | 18 | D6 | 1F | DA |
| 49D0 | B7 | 19 | 20 | 18 | 1E | 22 | 9D | 20 | 02 | AE | 01 | A6 | 03 | 4A | 26 | FD |
| 49E0 | E6 | 2D | B7 | 17 | E6 | 31 | B7 | 18 | E6 | 35 | B7 | 19 | 08 | 01 | 07 | 17 |
| 49F0 | 01 | 17 | 01 | 9D | 20 | 06 | 33 | 17 | 33 | 18 | 33 | 19 | A6 | 0D | B7 | 28 |
| 4A00 | AE | 03 | 9F | 4C | A4 | 03 | B7 | 1A | 97 | 17 | 01 | 0E | 00 | 00 | 66 | 39 |
| 4A10 | 66 | 3D | 66 | 41 | 0F | 12 | 6C | E6 | 39 | B8 | 17 | B7 | 15 | E6 | 3D | B8 |
| 4A20 | 18 | B7 | 16 | E6 | 41 | B8 | 19 | 44 | 97 | D6 | 1E | F3 | BE | 16 | 54 | D9 |
| 4A30 | 1E | F3 | BE | 15 | 54 | D9 | 1E | F3 | BE | 1A | E7 | 25 | B6 | 25 | BB | 26 |
| 4A40 | BB | 27 | BB | 28 | A1 | 0C | 22 | 03 | CC | 1A | FF | 0E | 22 | 03 | 9D | 20 |
| 4A50 | 07 | A1 | 50 | 25 | 03 | CC | 1B | 0B | 0E | 01 | 07 | 3A | 1D | 26 | 08 | CC |
| 4A60 | 1E | 6A | A6 | 19 | B7 | 1D | 9D | B6 | 1E | A1 | 01 | 27 | 3E | 3A | 13 | 26 |
| 4A70 | 3E | 3A | 14 | 27 | 3E | BE | 1E | D6 | 1F | DE | B7 | 13 | BE | 1A | 21 | E7 |
| 4A80 | CC | 1A | 02 | 3A | 12 | 27 | 03 | 9D | 20 | 02 | 1E | 12 | 0E | 01 | 07 | 3A |
| 4A90 | 1D | 26 | 08 | CC | 1E | 6A | A6 | 19 | B7 | 1D | 9D | A6 | 11 | 4A | 26 | FD |
| 4AA0 | 9D | 16 | 01 | A6 | 02 | 4A | 26 | FD | CC | 1A | 02 | 9D | 9D | 9D | 9D | 9D |
| 4AB0 | 9D | 20 | EE | BE | 1E | 26 | 12 | A6 | 04 | B7 | 01 | A6 | 02 | 4A | 26 | FD |

TABLE 2-continued

| | | | | | | | | | | | | | | | |
|---|---|---|---|---|---|---|---|---|---|---|---|---|---|---|---|
| 4AC0 | 3F | 01 | A6 | 0C | B7 | 13 | CC | 1B | B4 | 5A | 27 | 22 | 5A | 26 | 1B | 3A |
| 4AD0 | 24 | 27 | 08 | A6 | 02 | B7 | 1E | 9D | 9D | 20 | 0C | 0C | 22 | 04 | 3F | 1E |
| 4AE0 | 20 | 05 | A6 | 03 | B7 | 1E | 9D | CC | 1B | 59 | A3 | 04 | 27 | 0C | 3F | 01 |
| 4AF0 | 3F | 1E | 08 | 10 | 02 | 3C | 1E | CC | 19 | 9C | 3F | 01 | CC | 1E | A0 | BE |
| 4B00 | 1E | 26 | 21 | 9D | 9D | 21 | 0A | 1D | 22 | 20 | 06 | BE | 1E | 26 | 08 | 1C |
| 4B10 | 22 | A6 | 04 | B7 | 1E | 20 | E0 | 5A | 5A | 5A | A3 | 02 | 24 | 1A | A6 | 02 |
| 4B20 | B7 | 1E | 20 | 20 | 5A | A3 | 02 | 24 | 03 | CC | 1B | C8 | 5A | 5A | A3 | 02 |
| 4B30 | 24 | 06 | A6 | 02 | B7 | 1E | 20 | 07 | 5A | 5A | 26 | BE | CC | 1D | 55 | 9D |
| 4B40 | AE | 93 | 20 | 02 | AE | 35 | 0C | 22 | 04 | A6 | 01 | 20 | 04 | A6 | 10 | 21 |
| 4B50 | FC | B7 | 24 | 9D | 9D | A6 | 0B | 20 | 0D | AE | 91 | 9D | A6 | 05 | 20 | 04 |
| 4B60 | AE | 1F | A6 | 1E | 17 | 01 | BF | 13 | 4A | 26 | FD | 0E | 01 | 07 | 3A | 1D |
| 4B70 | 26 | 08 | CC | 1E | 6A | A6 | 19 | B7 | 1D | 9D | CD | 1E | B5 | 3A | 13 | 26 |
| 4B80 | EA | CC | 19 | 9C | 9C | CD | 1E | BC | 0E | 01 | 09 | A6 | 0F | B7 | 01 | AD |
| 4B90 | 2C | CC | 1E | 6A | 3A | 13 | B6 | 13 | A1 | 02 | 24 | 18 | A6 | 0F | B7 | 01 |
| 4BA0 | A6 | 02 | 4A | 26 | FD | 3F | 01 | BA | 13 | 26 | 09 | AD | 10 | AD | 0E | 3F |
| 4BB0 | 1E | CC | 19 | 9C | A6 | B6 | B7 | 08 | A6 | 0F | B7 | 09 | 8F | AE | 06 | A6 |
| 4BC0 | A5 | 4A | 26 | FD | 5A | 26 | F8 | 81 | A6 | 61 | B7 | 13 | A6 | 03 | B7 | 1A |
| 4BD0 | A6 | 05 | 4A | 26 | FD | 9D | CD | 1D | 1D | B6 | 13 | A1 | 05 | 22 | 0C | E6 |
| 4BE0 | 39 | 49 | 36 | 1C | 1D | 01 | 1D | 01 | 9D | 20 | 0C | CD | E6 | 39 | 45 | E6 |
| 4BF0 | 3D | E7 | 49 | E6 | 41 | E7 | 4D | 3A | 13 | 27 | 08 | CD | 1E | AE | CD | 1D |
| 4C00 | 10 | 20 | D3 | 3F | 1B | A6 | 03 | B7 | 13 | 36 | 1C | 4A | 26 | FB | CD | 1D |
| 4C10 | 05 | 1E | 11 | 12 | 11 | 0F | 11 | 05 | A6 | 04 | 9D | 20 | 04 | 3A | 1B | A6 |
| 4C20 | 01 | B7 | 14 | CD | 1D | 1D | A6 | 08 | 4A | 26 | FD | 9D | B6 | 1B | 4C | A6 |
| 4C30 | 03 | B7 | 1B | 97 | E6 | 45 | B8 | 17 | B7 | 15 | E6 | 49 | B8 | 18 | B7 | 16 |
| 4C40 | E6 | 4D | B8 | 19 | 44 | 97 | D6 | 1E | F3 | BE | 16 | 54 | D9 | 1E | F3 | BE |
| 4C50 | 15 | 54 | D9 | 1E | F3 | BE | 1B | 02 | 11 | 04 | E7 | 29 | 20 | 04 | E7 | 25 |
| 4C60 | 21 | FC | 3A | 14 | 26 | BD | CD | 1D | 03 | 11 | 32 | B6 | 25 | BB | 26 |
| 4C70 | BB | 27 | BB | 28 | A1 | 0C | 22 | 02 | 20 | 3A | 01 | 10 | 03 | 9D | 20 | 08 |
| 4C80 | A1 | 50 | 25 | 04 | 15 | 11 | 20 | 2E | B6 | 30 | B7 | 17 | B6 | 34 | B7 | 18 |
| 4C90 | B6 | 38 | B7 | 19 | A6 | 0C | 4A | 26 | FD | 13 | 11 | CC | 1C | 15 | 0B | 10 |
| 4CA0 | 07 | A6 | 02 | 4A | 26 | FD | 20 | 11 | B6 | 29 | BB | 2A | BB | 2B | BB | 2C |
| 4CB0 | A1 | 0C | 22 | 05 | 14 | 11 | CC | 1D | 2F | CD | 1D | 10 | 1F | 11 | 3A | 13 |
| 4CC0 | 27 | 0F | 12 | 11 | 3C | 1B | CD | 1D | 05 | 1D | 01 | 9D | 9D | 9D | CC | 1C |
| 4CD0 | 15 | A6 | 07 | 4A | 9D | 9D | 26 | FB | A6 | 02 | B7 | 1E | CD | 1D | 1D | 08 |
| 4CE0 | 10 | 0A | 1D | 01 | 1D | 01 | 9D | 3A | 1E | CC | 19 | 9C | 3A | 24 | 27 | 06 |
| 4CF0 | 1D | 01 | 1D | 01 | 20 | 0C | 0C | 22 | 04 | 3F | 1E | 20 | 05 | A6 | 03 | B7 |
| 4CD00 | 1E | 9D | CC | 1B | 60 | BE | 1B | 36 | 1C | 66 | 45 | 66 | 49 | 66 | 4D | 81 |
| 4D10 | B6 | 2F | B7 | 17 | B6 | 33 | B7 | 18 | B6 | 37 | B7 | 19 | 81 | B6 | 1A | 4C |
| 4D20 | A4 | 03 | B7 | 1A | 97 | 0E | 00 | 00 | 66 | 39 | 66 | 3D | 66 | 41 | 81 | 3F |
| 4D30 | 1F | 03 | 11 | 02 | 3C | 1F | 04 | 10 | 06 | 05 | 11 | 13 | 0D | 10 | 10 | A6 |
| 4D40 | 20 | B7 | 20 | 1F | 10 | 0A | 00 | 0D | A6 | 05 | B7 | 1E | CC | 19 | 9C | A6 |
| 4D50 | 80 | B7 | 20 | 1E | 10 | A6 | 04 | 20 | 0C | A6 | 0C | B7 | 20 | 1F | 10 | A6 |
| 4D60 | 02 | B7 | 1F | A6 | 0C | B7 | 22 | A6 | 60 | B7 | 01 | A6 | 19 | B7 | 1D | A6 |
| 4D70 | 7D | B7 | 21 | 09 | 22 | 03 | 9D | 20 | 02 | 1C | 00 | 17 | 01 | 05 | 22 | 04 |
| 4D80 | A6 | 06 | 20 | 04 | 21 | FE | A6 | 10 | 4A | 26 | FD | 9D | 9D | 1D | 00 | 3A |
| 4D90 | 21 | 26 | 6C | 3A | 20 | 26 | 0F | 07 | 22 | 05 | 1C | 23 | CC | 18 | 93 | 07 |
| 4DA0 | 11 | 01 | 81 | CC | 1E | 2C | 3A | 1F | 27 | 12 | 04 | 22 | 06 | 21 | 04 | A6 |
| 4DB0 | 0A | 20 | 02 | A6 | 01 | 4A | 26 | FD | 9D | 9D | 20 | B3 | 3C | 1F | A6 | 7D |
| 4DC0 | B7 | 21 | 07 | 22 | 16 | 05 | 22 | 05 | 15 | 22 | 9D | 20 | AC | 14 | 22 | A6 |
| 4DD0 | 08 | 4A | 26 | FD | 17 | 01 | 9D | 3C | 1F | 20 | 9E | 08 | 22 | 04 | 18 | 22 |
| 4DE0 | 20 | 9E | 19 | 22 | 21 | FC | 05 | 11 | 03 | 9D | 20 | 0B | 02 | 22 | 08 | 12 |
| 4DF0 | 22 | A6 | 05 | B7 | 1F | 20 | 82 | 13 | 22 | 9D | 9D | 9D | CC | 1D | 79 | 0E |
| 4E00 | 10 | 0E | 04 | 22 | 07 | A6 | 09 | 4A | 26 | FD | 9D | 9D | 17 | 01 | 20 | 11 |
| 4E10 | 0E | 01 | 09 | 3A | 1D | 26 | 0A | 1D | 10 | CC | 1E | 6C | A6 | 19 | B7 | 1D |
| 4E20 | 9D | 16 | 01 | 9D | A6 | 02 | 4A | 26 | FD | CC | 1D | 73 | 1B | 01 | 0F | 10 |
| 4E30 | 07 | 1D | 01 | 11 | 11 | CC | 1E | A0 | 01 | 11 | 04 | 11 | 11 | 20 | 15 | 0C |
| 4E40 | 10 | 08 | 02 | 10 | 05 | 1D | 01 | CC | 18 | 93 | 06 | 10 | 07 | A6 | 06 | B7 |
| 4E50 | 1E | CC | 19 | 9C | A6 | 19 | B7 | 1D | 0E | 01 | 07 | 3A | 1D | 26 | 07 | CC |
| 4E60 | 1E | 6C | A6 | 19 | B7 | 1D | AD | 4D | 20 | FE | 16 | 11 | A6 | 19 | B7 | 1D |
| 4E70 | 11 | 11 | 3F | 01 | 1D | 00 | 04 | 10 | 17 | 0C | 10 | 14 | 07 | 11 | 0B | 3F |
| 4E80 | 1F | A6 | 01 | B7 | 20 | 1F | 10 | CD | 1D | 55 | AD | 3A | 16 | 11 | 20 | 04 |
| 4E90 | 17 | 11 | 1C | 01 | 0F | 01 | 0F | 3A | 1D | 26 | 0F | 1D | 01 | 06 | 11 | 02 |
| 4EA0 | AD | 24 | 17 | 11 | 20 | 41 | A6 | 19 | B7 | 1D | AD | 09 | 20 | E6 | 9D | 1D |
| 4FB0 | 01 | 1D | 01 | 20 | 05 | A6 | 14 | 4A | 26 | FD | 21 | FE | 16 | 01 | A6 | 05 |
| 4EC0 | 4A | 26 | FD | 17 | 01 | 81 | A6 | 0C | B7 | 01 | A6 | C8 | 4A | 26 | FD | 18 |
| 4ED0 | 11 | 0C | 23 | 10 | A6 | 03 | 5F | 08 | 00 | 01 | 5C | 4A | 26 | F9 | A3 | 01 |
| 4EE0 | 22 | 02 | 19 | 11 | 3F | 01 | 81 | 0F | 23 | 06 | 09 | 11 | 03 | CC | 1D | 59 |
| 4EE0 | CC | 18 | 93 | 00 | 01 | 01 | 02 | 01 | 02 | 02 | 03 | 01 | 02 | 02 | 03 | 02 |
| 4FF00 | CC | 18 | 93 | 00 | 01 | 01 | 02 | 01 | 02 | 02 | 03 | 01 | 02 | 02 | 03 | 02 |
| 4F00 | 03 | 03 | 04 | 01 | 02 | 02 | 03 | 02 | 03 | 03 | 04 | 02 | 03 | 03 | 04 | 03 |
| 4F10 | 04 | 04 | 05 | 01 | 02 | 02 | 03 | 02 | 03 | 03 | 04 | 02 | 03 | 03 | 04 | 03 |
| 4F20 | 04 | 04 | 05 | 02 | 03 | 03 | 04 | 03 | 04 | 04 | 05 | 03 | 04 | 04 | 05 | 04 |
| 4F30 | 05 | 05 | 06 | 01 | 02 | 02 | 03 | 02 | 03 | 03 | 04 | 02 | 03 | 03 | 04 | 03 |
| 4F40 | 04 | 04 | 05 | 02 | 03 | 03 | 04 | 03 | 04 | 04 | 05 | 03 | 04 | 04 | 05 | 04 |
| 4F50 | 05 | 05 | 06 | 02 | 03 | 03 | 04 | 03 | 04 | 04 | 05 | 03 | 04 | 04 | 05 | 04 |
| 4F60 | 05 | 05 | 06 | 03 | 04 | 04 | 05 | 04 | 05 | 05 | 06 | 04 | 05 | 05 | 06 | 05 |
| 4F70 | 06 | 06 | 07 | D1 | AB | 88 | 6B | 2A | AC | 5A | D3 | 14 | 60 | 84 | B8 | 83 |
| 4F80 | D8 | E0 | 68 | 0B | 6C | 34 | ED | 30 | 83 | 64 | 39 | 4C | 07 | 38 | 6F |
| 4F90 | 90 | 77 | D0 | 08 | 30 | 98 | 37 | 3B | 72 | 8C | C3 | 27 | 87 | 50 | 0C | E4 |
| 4FA0 | 20 | 10 | 43 | A0 | A0 | 2A | B5 | 66 | A6 | A5 | A2 | 6E | DD | 5E | 3C | 8A |
| 4FB0 | 3E | C8 | 5A | 6C | 14 | B7 | 1C | D3 | DC | 6D | CA | 4A | 63 | 50 | EE | 5C |
| 4FC0 | 7E | 87 | BF | F3 | 9D | EC | 18 | 1F | 07 | 06 | 0C | 02 | 00 | 0C | 07 | 09 |

TABLE 2-continued

| 4FD0 | 06 | 09 | 40 | 40 | 2C | 2C | 65 | 65 | 94 | 94 | 92 | 92 | 06 | 06 | 60 | 01 |
|------|----|----|----|----|----|----|----|----|----|----|----|----|----|----|----|----|
| 4FF0 | 08 | 66 | AC | F4 | F4 | 01 | 01 | 01 | 01 | 0A | 62 | 62 | 58 | 80 | 58 | 58 |
| 4FF0 | 58 | 58 | 58 | 00 | 00 | 00 | 1B | 84 | 1B | 84 | 18 | 00 | 18 | 00 | 18 | 00 |

We claim:

1. A decoder for a receiver in a plural population of receivers, each said receiver having a predetermined alert sequence, for receiving transmitted coded information signals, including activation code signals, comprising:
means responsive to received coded signals designating the address of at least one said receiver in said plural population of receivers;
means responsive to the detection and decoding of an address of said addressed receiver for establishing a ready state of said addressed receiver to receive additional information signals; and
means responsive to a first activation code signal for activating said addressed receiver to begin said predetermined alert sequence.

2. A decoder, according to claim 1, wherein:
said means responsive to a first activation code signal further includes an audio circuit which is activated upon receipt of said first activation code signal.

3. A decoder for a receiver in a plural population of receivers, each said receiver having a predetermined alert sequence, for receiving transmitted coded information including activation code signals, comprising:
means responsive to a first set of received coded signals for selecting one of at least a first and second time period for said receiver to detect and decode received address coded signals;
timer means, responsive to said selecting means, for timing said first and second time periods;
means responsive to the detection and decoding of an address of said addressed receiver for establishing a ready state of said addressed receiver to receive additional information.

4. A decoder for a receiver, according to claim 3, wherein:
said first set of received coded signals includes one of a preamble and an inverted preamble, said selecting means selects said first time period in response to said first set of received coded signals having a preamble and selects said second time period in response to said first set of received coded signals having an inverted preamble.

5. A decoder for a receiver, according to claim 3, further comprising:
means responsive to a first activation code signal for enabling said addressed receiver to respond to subsequent information.

6. A decoder for a receiver, according to claim 5, wherein:
said means responsive to a first activation code signal further includes an audio circuit which is activated upon receipt of said first activation code signal.

7. A decoder for a receiver, according to claim 5, wherein:
said means responsive to a first activation code signal activates said predetermined alert sequence of said addressed receiver.

8. A decoder for a receiver in a plural population of receivers, each said receiver having a predetermined alert sequence, for receiving transmitted coded information including activation code signals, comprising:
receiver means, for receiving said transmitted coded information including said activation code signals;
audio circuit means, for generating an audio signal;
control means, connected to said receiver means and said audio circuit means, for decoding and detecting received coded signals which designate the address of at least one said receiver in said plural population of receivers for one of at least a first and a second time period, and for activating said predetermined alert sequence upon receipt of a first activation code signal, in accordance with said received transmitted coded information.

9. A decoder, according to claim 8, wherein said control means comprises:
a digital word detector and memory, connected to said receiver means, for receiving digital signals from said receiver and correlating said digital signals with information at a stored address of said memory;
a selector circuit, connected to said receiver means and said audio circuit means, for selecting the output of said audio circuit means;
a control logic circuit, connected to said digital word detector and memory, said selector circuit and said receiver means, for controlling the output of said receiver means, selector means and audio circuit means, said control logic circuit including a programmable timer for timing said at least first and second time periods; and
a timer clock, connected to said selector circuit, said digital word detector and said control logic circuit, for providing a time base.

10. A decoder, according to claim 8, wherein said control means comprises:
a microprocessor, connected to said receiving means, for processing said received transmitted coded information;
a read only memory, connected to said microprocessor, for storing information for use by said microprocessor;
a code plug, connected to said microprocessor, for storing address information pertaining to said receiver; and
a support circuit, connected to said microprocessor and said receiver means, for controlling the switching of power to said receiver.

11. A method of decoding encoded signals including activation signals for transmitting information to a receiver in a plural population of receivers, each said receiver having a predetermined alert sequence and an audio circuit, comprising the steps of:
detecting and decoding signals corresponding to the address of said receiver in said plural population;
correlating the received address signals with predetermined address information contained within said receiver;
producing a control signal when said received address signals correspond to said predetermined address information;
detecting and decoding first activation code signals, subsequent to production of said control signal, for enabling said receiver to respond.

12. A method of decoding encoded signals according to claim 11, wherein said step of detecting and decoding first activation code signals further includes the step of:
   initiating said predetermined alert sequence of said addressed receiver.

13. A method according to claim 11, wherein said step of detecting and decoding first activation code signals includes the step of:
   activating an audio circuit upon receiving said first activation code signals.

14. A method of decoding encoded signals including activation signals for transmitting information to a receiver in a plural population of receivers, each said receiver having a predetermined alert sequence, comprising the steps of:
   detecting and decoding a first set of received coded signals;
   selecting one of at least a first and a second time period for detecting and decoding received address coded signals by said receiver in response to said first set of received coded signals;
   detecting and decoding received address signals for the duration of said selected one of said first and second time periods;
   correlating the received address signals with predetermined address information contained within said receiver;
   producing a control signal when said received address coded signals correspond to said predetermined address information.

15. A method of decoding encoded signals according to claim 14, further comprising the step of:
   detecting and decoding first activation code signals subsequent to production of said control signal for enabling said addressed receiver to respond.

16. A method of decoding encoded signals according to claim 15, wherein the step of detecting and decoding first activation code signals, further comprising the step of:
   initiating said predetermined alert sequence of said addressed receiver.

17. A method of decoding encoded signals according to claim 15, wherein the step of detecting and decoding first activation code signals, further comprising the step of:
   activating an audio circuit upon receiving said first activation code signals.

* * * * *